(12) United States Patent
Terry et al.

(10) Patent No.: US 8,830,637 B2
(45) Date of Patent: Sep. 9, 2014

(54) METHODS AND APPARATUS TO CLAMP OVERVOLTAGES FOR ALTERNATING CURRENT SYSTEMS

(75) Inventors: Stephen Christopher Terry, Knoxville, TN (US); Paul L. Brohlin, Parker, TX (US)

(73) Assignee: Texas Instruments Incorporated, Dallas, TX (US)

( * ) Notice: Subject to any disclaimer, the term of this patent is extended or adjusted under 35 U.S.C. 154(b) by 127 days.

(21) Appl. No.: 12/873,053

(22) Filed: Aug. 31, 2010

(65) Prior Publication Data

US 2012/0050931 A1    Mar. 1, 2012

(51) Int. Cl.
*H02H 3/20* (2006.01)
*H02H 9/04* (2006.01)

(52) U.S. Cl.
CPC ........................... *H02H 9/04* (2013.01)
USPC ............................. 361/18; 361/91.1

(58) Field of Classification Search
USPC .......................... 361/18, 91.1, 111
See application file for complete search history.

(56) References Cited

U.S. PATENT DOCUMENTS

| | | | |
|---|---|---|---|
| 4,656,554 A | 4/1987 | Maschek et al. | |
| 5,111,353 A | 5/1992 | Kotowski et al. | |
| 5,666,255 A * | 9/1997 | Muelleman | 361/111 |
| 5,687,065 A * | 11/1997 | Majid | 363/89 |
| 6,069,811 A | 5/2000 | Moriguchi et al. | |
| 6,169,675 B1 * | 1/2001 | Shimamori et al. | 363/70 |
| 2002/0118554 A1 * | 8/2002 | Watanabe et al. | 363/39 |
| 2004/0125531 A1 * | 7/2004 | Nguyen et al. | 361/118 |
| 2005/0068705 A1 | 3/2005 | Nakahara | |
| 2006/0034109 A1 * | 2/2006 | Benabdelaziz et al. | 363/125 |
| 2010/0277132 A1 * | 11/2010 | Hara et al. | 320/163 |

OTHER PUBLICATIONS

PCT Search Report mailed Feb. 29, 2012.

* cited by examiner

*Primary Examiner* — Danny Nguyen
(74) *Attorney, Agent, or Firm* — William B. Kempler; Frederick J. Telecky, Jr.

(57) ABSTRACT

Methods and apparatus to clamp overvoltages for inductive power transfer systems are described herein. An example overvoltage protection circuit is described, including a first terminal configured to receive an alternating current signal for conversion to a second signal, a capacitor, a first switch configured to selectively electrically couple the capacitor to the first terminal based on an overvoltage detection signal to reduce an overvoltage on the second signal, and an overvoltage detector. The example overvoltage detector is configured to determine a signal level of the second signal and, in response to determining that the signal level of the second signal is greater than a threshold, to output the overvoltage detection signal to cause the switch to electrically couple the capacitor between the first terminal and a second terminal.

9 Claims, 8 Drawing Sheets

METHODS AND APPARATUS TO CLAMP OVERVOLTAGES FOR ALTERNATING CURRENT SYSTEMS

FIELD OF THE DISCLOSURE

This disclosure relates generally to clamping circuits and, more particularly, to methods and apparatus to clamp overvoltages for alternating current systems.

BACKGROUND

Inductive power transfer systems are generally used to transfer power wirelessly between a transmitting unit and a receiving unit. The transmitting unit generates a magnetic field via an inductive coil. When the receiving unit, which includes another inductive coil, is placed within the magnetic field, the magnetic field causes the receiving unit to generate an electrical current proportional to the magnetic field generated by the transmitting unit. The electrical current generated at the receiving unit is an alternating current, and the efficiency of the power transfer from the transmitting unit to the receiving unit may be improved by alternating the current at a resonance frequency of an inductive-capacitive filter circuit that may be used to filter the current generated in the receiving unit.

SUMMARY

In some described examples, an overvoltage protection circuit includes a first terminal configured to receive an alternating current signal for conversion to a second signal, a second terminal to receive the second signal based on the alternating current signal, a capacitor in circuit with the first terminal, a switch in circuit with the capacitor and the first terminal configured to selectively electrically couple the capacitor to the first terminal based on an overvoltage detection signal to reduce an overvoltage on the second signal, and an overvoltage detector in circuit with the second terminal and the switch and configured to determine a signal level of the second signal and, in response to determining that the signal level of the second signal is greater than a threshold, to output the overvoltage detection signal to cause the switch to electrically couple the capacitor between the first terminal and a second terminal.

Some described example methods to clamp overvoltages include receiving an alternating current signal at a first power source terminal, rectifying the alternating current signal to generate a rectified signal, comparing the rectified signal to a threshold signal level, and coupling a capacitor to the first power source terminal when the rectified signal is greater than the threshold signal level.

DETAILED DESCRIPTION

Certain examples are shown in the above-identified figures and described in detail below. In describing these examples, like or identical reference numbers will be used to identify common or similar elements. Although the following discloses example methods and apparatus, it should be noted that such methods and apparatus are merely illustrative and should not be considered as limiting. The example circuits described herein may be implemented using any suitable technique or technology, such as discrete components, integrated circuits (ICs), or any combination thereof. Accordingly, while the following describes example circuits, apparatus, and methods, persons of ordinary skill in the art will readily appreciate that the examples are not the only way to implement such methods and apparatus.

While some example logic is shown to implement the methods and apparatus described herein, many other implementations are applicable. Any combination of logic methodologies including, but not limited to, discrete logic, integrated logic, programmed logic, etc., may be used to implement the methods and apparatus described herein. The advantages of some logical methods over others will be apparent, and the selection of the implementation will be dependent on the application.

The example methods and apparatus described herein may be used to provide overvoltage protection to devices receiving alternating current (AC) electrical power. Example apparatus include a capacitor to clamp an input voltage when an output signal from a rectifier circuit exceeds a threshold signal level. In some examples, the threshold signal level is a signal level greater than a normal operating signal level but less than a signal level at which a circuit may be damaged. The capacitor is selectively switched in as a shunt capacitor to reduce the output signal level. When the capacitor is switched (e.g., coupled) into the circuit, the capacitor redirects energy away from the output without substantial dissipation of the energy. Because the capacitor does not substantially dissipate energy, the capacitor may be implemented in much smaller circuit areas and, thus, in smaller applications than known overvoltage protection devices such as transient voltage suppressors. Using the example methods and apparatus herein, an overvoltage protection circuit may be less expensively implemented into devices receiving AC power. When the output signal decreases below the threshold signal, the capacitor is removed from the circuit to allow normal operation to resume.

In some examples, the capacitor is only switched in or out (e.g., coupled or decoupled) of the circuit when an AC input signal is substantially at neutral or less than a threshold. By limiting when the capacitor may be coupled or decoupled, the example methods and apparatus reduce exposure of the switch to high current and/or voltage spikes that can occur when a discharged capacitor is suddenly coupled to a voltage or current source and/or when a charged capacitor is suddenly decoupled from a voltage or current source.

The examples described below depict an implementation of the methods and apparatus in wireless inductive power transfer systems. However, the example methods and apparatus are equally applicable to other implementations include receiving and converting an AC power signal to a direct current (DC) power signal. While some example component values (e.g., resistance, capacitance) are provided, these values are examples that may be modified to accommodate other applications having different voltage, current, power, and/or frequency requirements, among other things.

Figure 1:
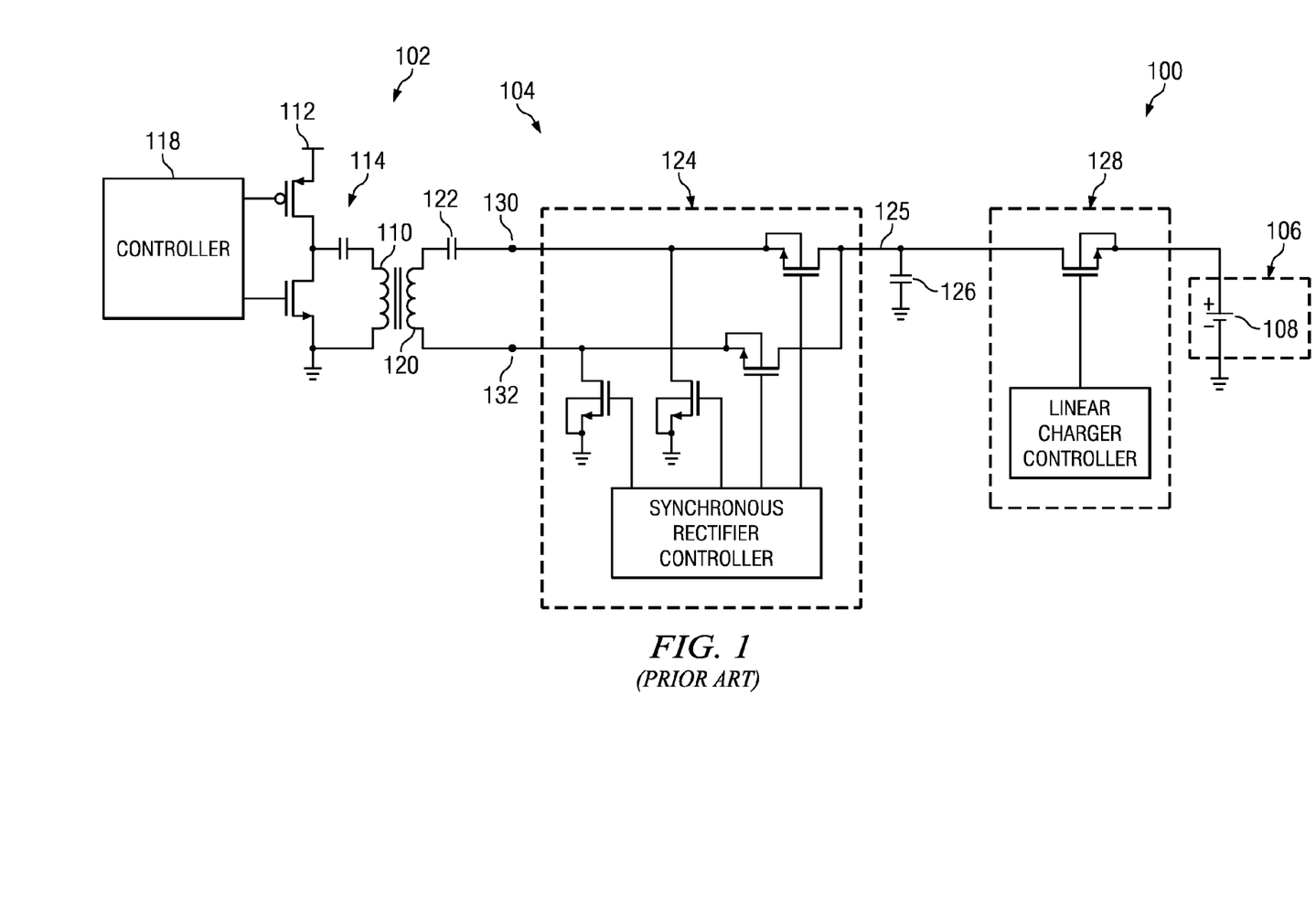
FIG. 1 is a schematic diagram of an inductive power transfer system.

FIG. 1 is a schematic diagram of an inductive power transfer system 100. The inductive power transfer system 100 transfers electrical power from a transmitter circuit 102 to a receiver circuit 104, which may condition the electrical power and provide the conditioned power to an output device 106. In the example of FIG. 1, the output device 106 is a battery 108 that is charged by the receiver circuit 104.

The transmitter circuit 102 includes a transmitter coil 110 that receives an alternating current from a direct current (DC) power supply 112 via a switching network 114. A controller 118 controls the switching network 114 to couple and decouple the transmitter coil 110 to the power supply 112 to cause an AC current to flow through the transmitter coil 110. The transmitter coil 110 generates a magnetic field due to the AC current flowing through the transmitter coil 110. In some examples, the transmitter coil 110 is a 30-turn coil.

The transmitting circuit 102 and the receiving circuit 104 may be physically coupled and/or decoupled to activate and/or deactivate, respectively, power transfer between the transmitting circuit 102 and the receiving circuit 104. The receiver circuit 104 includes a receiving coil 120 which, when placed within the magnetic field generated by the transmitter coil 110, becomes a transformer in combination with the transmitter coil 110. The receiver circuit 104 further includes a series capacitor 122 that establishes an inductive-capacitive (LC) filter and a resonance frequency in combination with the receiving coil 120. As the operating frequency (e.g., the frequency of the AC signal in the transmitter coil 110 and/or the receiving coil 120) approaches the resonance frequency of the receiver circuit 104, the receiving coil 120 behaves similar to a current source.

When the receiver circuit 104 is placed in the magnetic field of the transmitter coil 110, the magnetic field induces an AC current in the receiving coil 120. The receiver coil 120 feeds the induced current to a synchronous rectifier 124, which converts the received AC current to a DC current. The synchronous rectifier 124 outputs the DC current to a rectifier capacitor 126, which smoothes the DC current. As used herein, rectifier output or rectifier voltage refers to a voltage of a DC signal at the output terminal 125 of the synchronous rectifier 124. The example receiver circuit 104 further includes a linear charger 128 to generate a linear voltage and/or current for output to the output device 106.

The synchronous rectifier 124 includes two input terminals 130 and 132 to receive the AC input signal from the receiving coil 120. Each of the terminals 130 and 132 may be considered to have an AC phase during which the respective terminal 130 or 132 sinks (e.g., receives) current from the receiving coil 120, which is used to source (e.g., provide) current at a rectifier output terminal 125. The synchronous rectifier 124 operates by coupling one of the terminals 130 (e.g., the terminal sourcing current to the synchronous rectifier 124) at a time to the output terminal 125 of the synchronous rectifier 124 while coupling the other of the terminals 132 to a reference terminal (e.g., a ground, a neutral terminal). When signal level of the terminal 130 has decreased and the other terminal 132 begins to source current, the synchronous rectifier 124 switches to coupling the other terminal 132 to the rectifier output terminal 125 while coupling the terminal 130 to the reference. Thus, each terminal 130 or 132 either directs current from the receiving coil 120 to the synchronous rectifier 124 or is tied to the reference terminal at any given time.

The rectifier output current-voltage line of the system 100 approaches a constant current as the operating frequency of the rectifier approaches the resonance frequency of the example receiver circuit 104 and, thus, approaches current source behavior. Therefore, the synchronous rectifier 124, the rectifier capacitor 126, and the linear charger 128 may be subject to sufficiently high voltages and power to cause damage.

Figure 2:
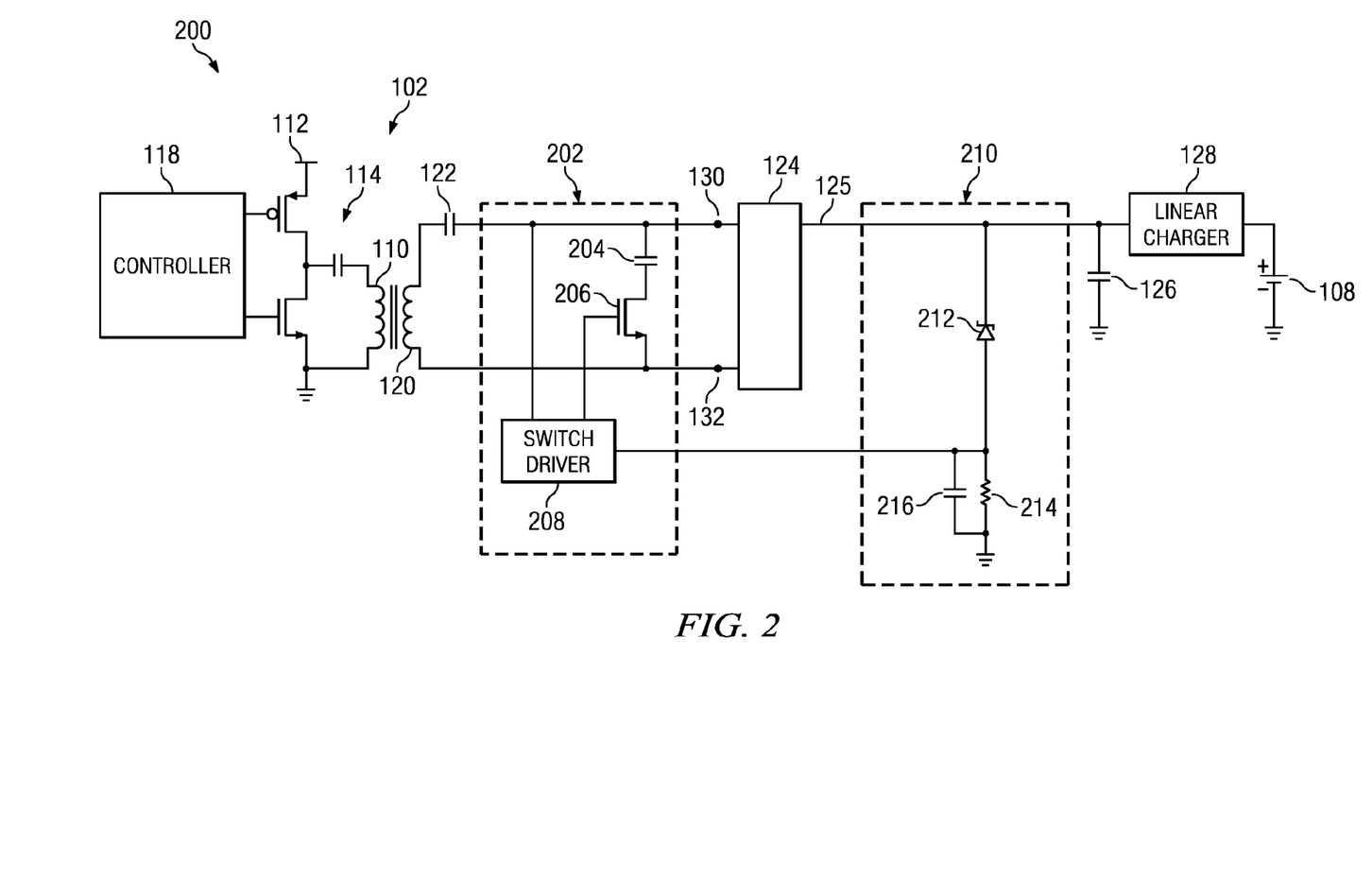
FIG. 2 is a schematic diagram of an example inductive power transfer system including a clamping circuit using a capacitor.

FIG. 2 is a schematic diagram of an example inductive power transfer system 200 including a clamping circuit 202 using a clamp capacitor 204. The example inductive power transfer system 200 includes the example transmitter circuit 102, the example receiving coil 120, the example series capacitor 122, the example synchronous rectifier 124 having terminals 130 and 132 and a rectifier output terminal 125, the example rectifier capacitor 126, and the example linear charger 128 of FIG. 1 to charge the example battery 108 of FIG. 1. The example receiving coil 120 of FIG. 2 is an 18-turn coil and the example series capacitor 122 has 100 nano-Farads (nF) of capacitance. Accordingly, the resonance frequency of the example receiver circuit 104 is about 100 kilohertz (kHz). In the example system 200, the receiving coil 120 does not generate more than 1 Ampere (A) of current, even at higher voltages and near the resonance frequency, due to the amount of power provided by the transmitter circuit 102. Of course, other capacitor values or numbers of turns may be used.

The example capacitive clamp 202 further includes a switching element 206 and a switch driver 208 to selectively couple the clamp capacitor 204 between the input terminals 130 and 132 of the synchronous rectifier 124. The example switching element 206 is illustrated in FIG. 2 as an re-channel metal-oxide-semiconductor (NMOS) field effect transistor (FET). However, other types of switching devices may be used, including p-channel metal-oxide-semiconductor (PMOS) FETs, bipolar junction transistors, and/or other types of electrical and/or electromechanical switches. The switching element 206 is controlled (e.g., via the gate terminal of the NMOS) by the switch driver 208.

To prevent damage to the receiver circuit 104 that may be caused by overvoltage conditions, the example inductive power transfer system 200 is provided with the clamping circuit 202 and an overvoltage detector 210. In general, the clamping circuit 202 prevents or reduces an overvoltage condition at the rectifier output terminal 125 by clamping the voltage between the terminals 130 and 132 in response to determining that an overvoltage condition exists or may exist at the rectifier output terminal 125. The overvoltage detector 210 is in communication with the rectifier output terminal 125 and the clamping circuit 202 to monitor the rectifier voltage.

The example overvoltage detector 210 includes a breakdown (e.g., Zener) diode 212, a pull down resistor 214, and a capacitor 216. The overvoltage detector 210 provides an overvoltage detection signal to the switch driver 208 indicative of whether an overvoltage condition exists at the output of the synchronous rectifier 124. The breakdown diode 212 has a breakdown voltage, which may be selected to be an upper threshold of the rectifier voltage. In the illustrated example, the rectifier voltage is typically less than 10 V with respect to ground, and the synchronous rectifier 124 and/or the linear charger 128 may be damaged by voltages as low as 20 V. The example breakdown diode 212 therefore has a breakdown voltage selected between 12 and 16 V. The example resistor 214 has a resistance of 10 kilo-ohms (kΩ) and the example capacitor 216 has a capacitance of 1 micro-Farad (μF). Of course, the values of the breakdown voltage, the resistance, and/or the capacitance may be adjusted according to a particular application. The resistance and capacitance values may determine a reaction time of the overvoltage detector 210 to an overvoltage condition.

When an overvoltage condition is not present, the overvoltage detection signal is pulled down to a reference voltage (e.g., ground, 0 V) by the resistor 214 because the breakdown diode 212 does not conduct current. However, when an overvoltage condition occurs (e.g., when the rectifier output voltage increases above the breakdown voltage), the breakdown diode 212 has an avalanche breakdown. As a result, current flows through the resistor 214 and increases the overvoltage detection signal voltage.

The switch driver 208 detects the overvoltage condition when the overvoltage detection signal voltage is sufficiently high to be considered a logical one (e.g., logical high). However, the switch driver 208 may delay or prevent coupling or decoupling of the clamp capacitor 204 into the circuit based on the AC signal level(s). The switch driver 208 determines whether the AC signals at the terminals 130 and 132 are sufficiently low to couple the clamp capacitor 204 between the terminals 130 and 132. If the AC signals at the terminals 130 and 132 are too high and the clamp capacitor 204 is discharged, a large inrush current may occur when the clamp capacitor 204 is connected between the terminals 130 and 132. Similarly, a large capacitor discharge current may occur if the clamp capacitor 204 is disconnected from the terminals 130 and 132 when the clamp capacitor 204 is charged. An inrush or discharge current may cause a large voltage across the switching element 206. In such a case, the switching element 206 must either be sufficiently robust to handle the inrush (e.g., increase the size of an NMOS) or the switch 206 may be damaged. A larger NMOS is generally undesirable in microcircuit applications. To use a smaller switching element 206 and prevent damage to the switching element 206, the switch driver 208 couples and decouples the clamp capacitor 204 to the terminals 130 and 132 when the AC signal has a sufficiently low voltage as explained in more detail below. Instead, the switch driver 208 allows the switching element 206 to respond to the presence and/or lack of an overvoltage condition within one-half of a period of the operating frequency of the system 200 while using smaller, less expensive circuit components. While larger components may be used to handle larger voltages and/or powers, they may cause the inductive power transfer system 200 to become prohibitively expensive.

Figure 3A:
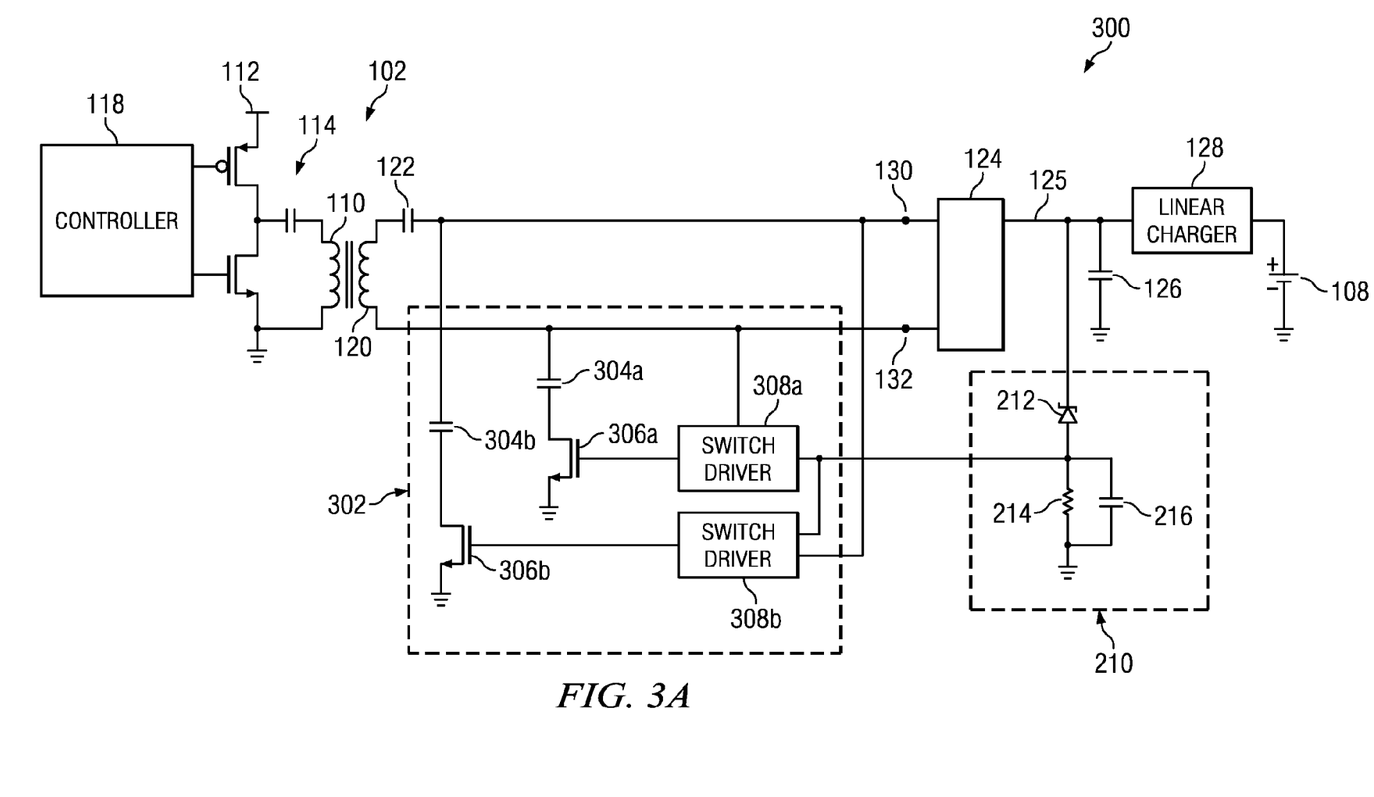
FIG. 3A is a schematic diagram of another example inductive power transfer system including a clamping circuit implemented using a plurality of capacitors.

FIG. 3A is a schematic diagram of another example inductive power transfer system 300 including a clamping circuit 302 implemented using capacitors 304a and 304b. The example clamping circuit 302 further includes switching elements 306a and 306b and switch drivers 308a and 308b to selectively couple respective ones of the clamp capacitors 304a and 304b between the input terminals 130 and 132 of the synchronous rectifier 124 and a reference (e.g., ground, neutral). The example inductive power transfer system 300 further includes the example overvoltage detector 210 illustrated in FIG. 2.

The example clamp capacitor 304a, the example switching element 306a, and the example switch driver 308a may operate in a similar or identical manner to the respective ones of the clamp capacitor 204, the switching element 206, and the switch driver 208 described above with reference to FIG. 2. However, the clamp capacitor 304a is selectively coupled between the terminal 130 and the reference. Similarly, the example clamp capacitor 304b, the example switching element 306b, and the example switch driver 308b may operate in a similar or identical manner to the respective ones of the clamp capacitor 204, the switching element 206, and the switch driver 208, with the exception that the clamp capacitor 204b is selectively coupled between the terminal 132 and the reference. When both the switching elements 306a and 306b are switched on and coupling the clamp capacitors 304a and 304b between the respective ones of the terminals 130 and 132 and the reference, the terminals 130 and 132 are effectively coupled via the switching elements 306a and 306b and the reference.

The switch drivers 308a and 308b restrict the switching of the respective switching elements 306a and 306b based on the respective AC signals at terminals 130 and 132. Thus, the switch driver 308a only permits the switching element 306a to couple and decouple the clamp capacitor 304a between the terminal 130 and the reference when the AC signal at the terminal 130 is below a predetermined threshold. Similarly, the switch driver 308b only permits the switching element 306b to couple and decouple the clamp capacitor 304b between the terminal 132 and the reference when the AC signal at the terminal 132 is below the predetermined threshold.

Figure 3B:
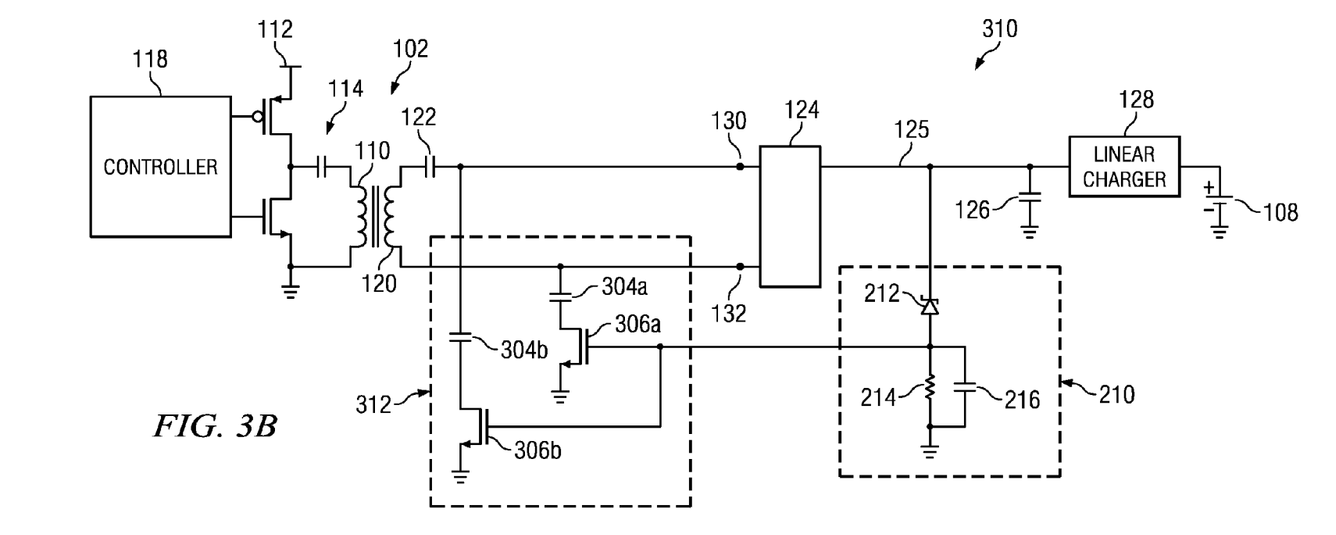
FIG. 3B is a schematic diagram of another example inductive power transfer system including a clamping circuit implemented without switch drivers.

FIG. 3B is a schematic diagram of another example inductive power transfer system 310 including a clamping circuit 312 implemented without switch drivers. The example clamping circuit 312 includes the clamp capacitors 304a and 304b and the switching elements 306a and 306b of FIG. 3A. However, the clamping circuit 312 does not including switch drivers 308a or 308b of FIG. 3A. Instead, the input terminals of the switching elements 306a and 306b (e.g., gate terminals of FETs) are coupled to the anode terminal of the example breakdown diode 212. In operation, when an overvoltage condition occurs at the rectifier output terminal 125, the breakdown diode 212 begins conducting current, which increases the voltage at the input terminals of the switching elements 306a and 306b, which couple the terminals 130 and 132 to the reference. Conversely, when the overvoltage condition is no longer present, the breakdown diode 212 stops conducting current and the resistor 214 pulls the voltage down and causes the switching elements 306a and 306b to decouple the terminals 130 and 132 from the reference.

Because the example clamping circuit 312 of FIG. 3B does not include the switch drivers 308a and 308b, the switching elements 306a and 306b may turned on (e.g., couple the terminals 130 and 132 to the reference) by the overvoltage detector 210 independent of the AC voltage at the terminals 130 and 132. Thus, in some examples, the switching elements 306a and 306b may be implemented using relatively large external switching elements to enable the switching elements 306a and 306b to handle inrush and/or capacitor discharge currents without causing damage to the switching elements 306a and 306b or to the inductive power transfer system 310.

In the example systems 200, 300, and 310 of FIGS. 2, 3A and 3B, the resonance frequency or approximately the resonance frequency of the receiver circuit 104 is an advantageous operating frequency because the transmission of energy from the transmitter circuit 102 to the receiver circuit 104 has an increased efficiency as the operating frequency approaches the resonance frequency. Thus, the rectifier voltage at the rectifier output terminal 125 may become very high at the resonance frequency.

Figure 4:
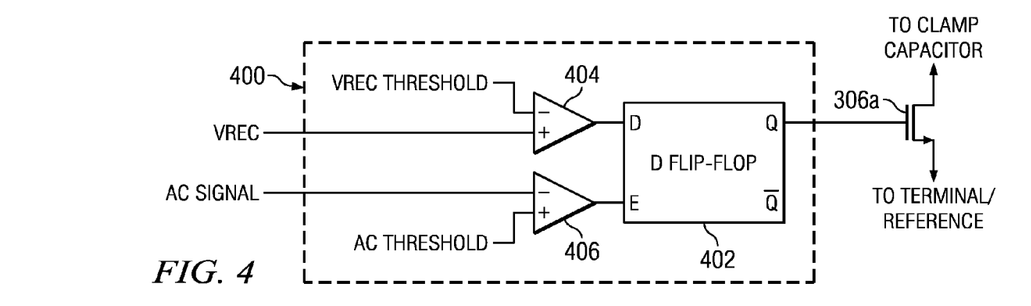
FIG. 4 is a schematic diagram of an example switch driver that may be used to implement the switch drivers in FIG. 2 and FIG. 3A.

FIG. 4 is a schematic diagram of an example switch driver 400 that may be used to implement the switch drivers 208, 308*a*, and 308*b* in FIGS. 2 and 3A. For clarity and brevity, FIG. 4 will be described as implementing the example switch driver 308*a* of FIG. 3A. The example switch driver 400 includes a gated D latch 402 and two comparators 404 and 406. The gated D latch 402 receives an input signal at a D terminal and an enable signal at an E terminal and outputs the clamp signal from a Q terminal. The E terminal controls whether the input signal is passed through as the clamp signal. The comparator 406 compares the AC signal (AC SIGNAL) at the terminal 130 to a threshold (AC THRESHOLD) to determine whether the AC signal has a sufficiently low signal level to couple and/or decouple the clamp capacitor 304*a* between the terminal 132 and the reference. Thus, when the AC signal is lower than the threshold, the comparator 406 outputs a logic high signal to enable the gated D latch 402 (e.g., output from the Q terminal the input signal received at the D terminal).

The comparator 404 compares the rectifier voltage (VREC) to a rectifier voltage threshold (VREC THRESHOLD). When the rectifier voltage is greater than the threshold (e.g., an overvoltage condition exists), the comparator outputs a high logic signal to the D terminal of the gated D latch 402. When the E terminal of the latch 402 is enabled (e.g., the AC signal is less than the AC threshold), the input to the D terminal is output from the Q terminal (e.g., the clamp signal). The clamp signal is input to the switch input of the switching element 306*a* (e.g., a gate terminal of an NMOS). Thus, when the E terminal of the latch 402 is enabled and the rectifier voltage is in an overvoltage condition, the Q terminal outputs a logic high clamp signal that causes the switching element 306*a* to couple the clamp capacitor 304*a* between the terminal 132 and the reference. Similarly, when the E terminal of the latch 402 is enabled and the rectifier voltage is not in an overvoltage condition, the Q terminal outputs a logic low clamp signal that turns off the switching element to decouple the clamp capacitor 304*a* from the terminal 132 and the reference. However, when the E terminal of the latch 402 is disabled, the clamp signal remains constant regardless of the overvoltage condition.

In some examples, the gated D latch 402 may be implemented using a D flip-flop. In those cases, the D flip-flop is edge-sensitive and may change its output (e.g., may change the state of the switching element 306*a* based on the presence and/or absence of an overvoltage condition) only when the output from the comparator 406 changes from low to high (e.g., when the AC signal decreases below the AC threshold).

Figure 5:
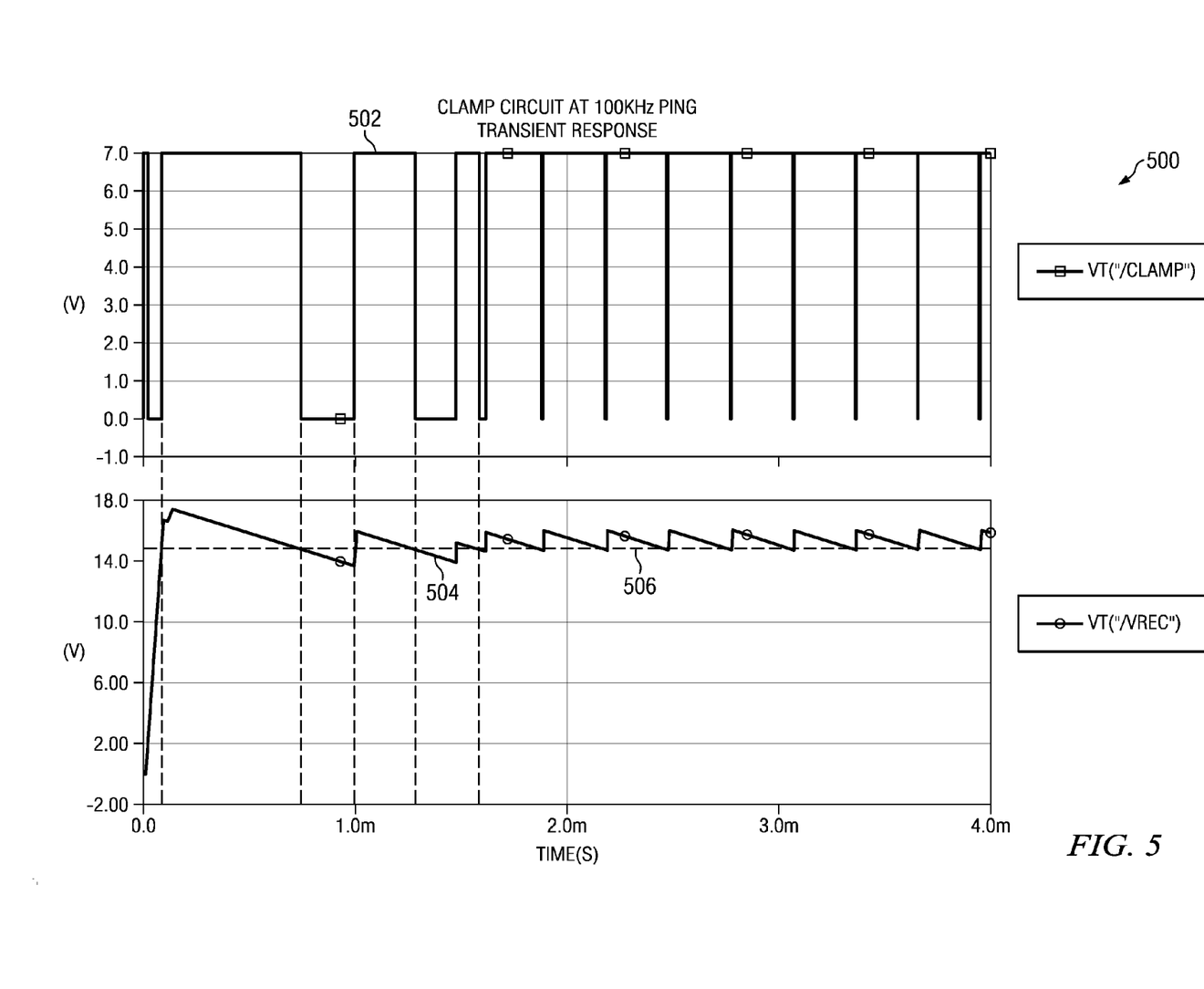
FIG. 5 is a graph illustrating example clamp comparator and rectifier output voltages.

FIG. 5 is a graph 500 illustrating example clamp signal 502 (e.g., the outputs of the switch driver 208, 308*a*, and 308*b* of FIGS. 2 and 3A) and rectifier output 504 voltages. When the rectifier output 504 exceeds a threshold 506 (e.g., about 14 V), the clamp signal 502 activates (e.g., turns on the switching element 206). While the clamp signal 502 is activated, the clamp capacitor 204 clamps the AC signal at the terminals 130 and 132 to reduce the rectifier output 504. When the rectifier output 504 decreases below the threshold 506, the clamp signal 502 decreases to a logical low, which turns off the switching element 206 to decouple the clamp capacitor 204 from the terminals 130 and 132.

Figure 6:
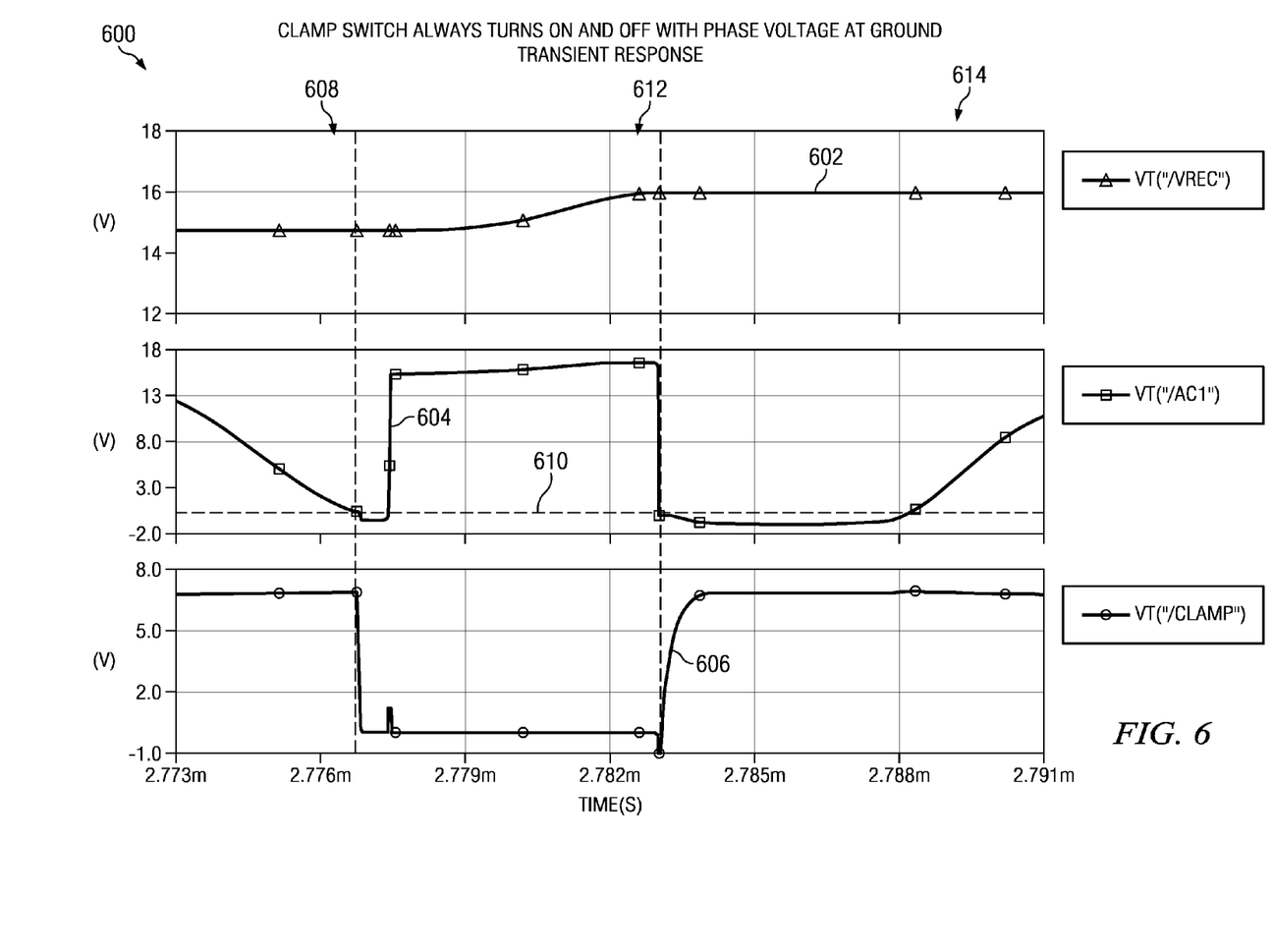
FIG. 6 is a graph illustrating example rectifier output, alternating current signal, and clamp signal voltages.

FIG. 6 is a graph 600 illustrating example rectifier output 602, AC signal 604, and clamp signal voltages 606. The example graph 600 has a smaller time base than the example graph 500 and illustrates the increase in rectifier voltage in more detail.

During a first time period 608, the rectifier output 602 is less than an overvoltage threshold (e.g., the rectifier output 602 is not in an overvoltage condition), the AC signal 604 is in phase (e.g., the terminal 130 of the synchronous rectifier 124 of FIG. 1 is sinking current), and the clamp signal 606 is at a logical high (e.g., the clamp capacitor 204 is coupled between the terminals 130 and 132). Although the rectifier output 602 is less than the overvoltage threshold, the clamp signal 606 remains at logic high because the switch driver 208 prevents the clamp signal 606 from changing while the AC signal 604 is higher than a threshold 810.

At the end of the first time period 608, the AC signal 604 decreases below the threshold 610, at which time the clamp signal 606 decreases because the rectifier output 602 is also less than an overvoltage threshold. During a second time period 612, the rectifier output 602 increases above the overvoltage threshold. While the AC signal 604 is not in phase (e.g., the terminal 132 sinks current), the voltage of the AC signal 604 may still increase due to the LC filter that includes the receiving coil 120 and the series capacitor 122 of FIG. 1. Thus, the switch driver 208 prevents the clamp signal 606 from increasing to couple the clamp capacitor 204 in response to the overvoltage condition. When the AC signal 604 decreases below the threshold 610, the switch driver 208 increases the clamp signal 606 to logic high to couple the clamp capacitor 204 to the terminal 130. Thus, during a third time period 614, the clamp capacitor 204 clamps the AC signal 604 to reduce the rectifier output 602. As result, the rectifier output 602 decreases and the AC signal 604 increases more slowly relative to when the AC signal 604 is not clamped.

Figure 7:
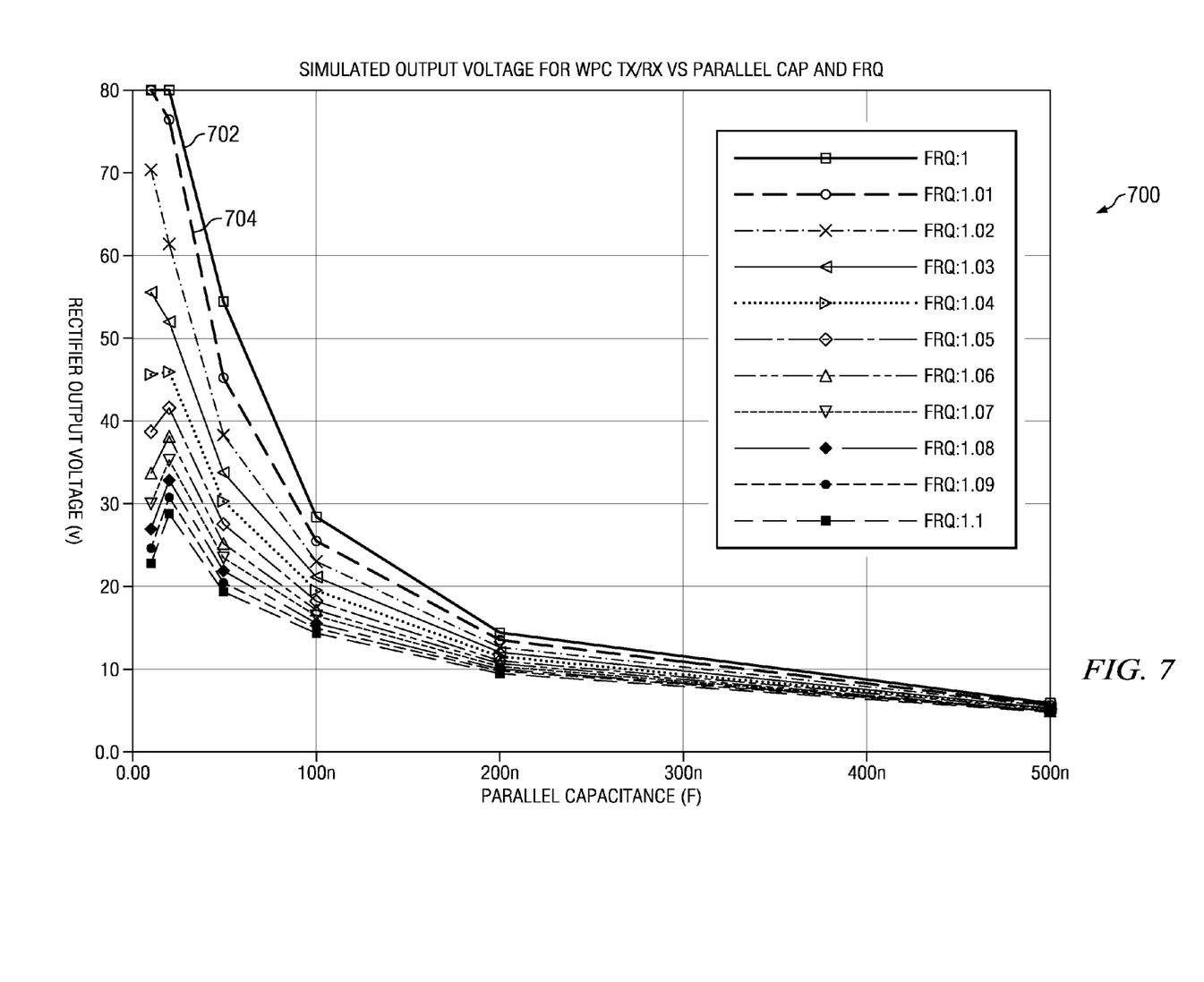
FIG. 7 is a graph illustrating a simulated rectifier output voltage as a function of frequency and a value of the clamp capacitor of FIG. 2.

FIG. 7 is a graph 700 illustrating simulated rectifier output voltages as a function of frequency and parallel capacitance for the example inductive power transfer system 100 of FIG. 1. The example frequency lines 702 and 704 are shown as respective multiples of the resonance frequency. As shown in FIG. 7, the rectifier output of FIG. 1 may be clamped below 20 V at any frequency using a clamp capacitor having a capacitance value of greater than about 140 nF. The example clamp capacitor 204 of FIG. 2 has a capacitance value of 200 nF. The example clamp capacitors 304*a* and 304*b* of FIG. 3A each have a capacitance value of 450 nF. Thus, when both clamp capacitors 304*a* and 304*b* of FIG. 3A couple the respective rectifier terminals 130 and 132 to the reference, the effective capacitance between the terminals 130 and 132 is about 450 nF.

Figure 8:
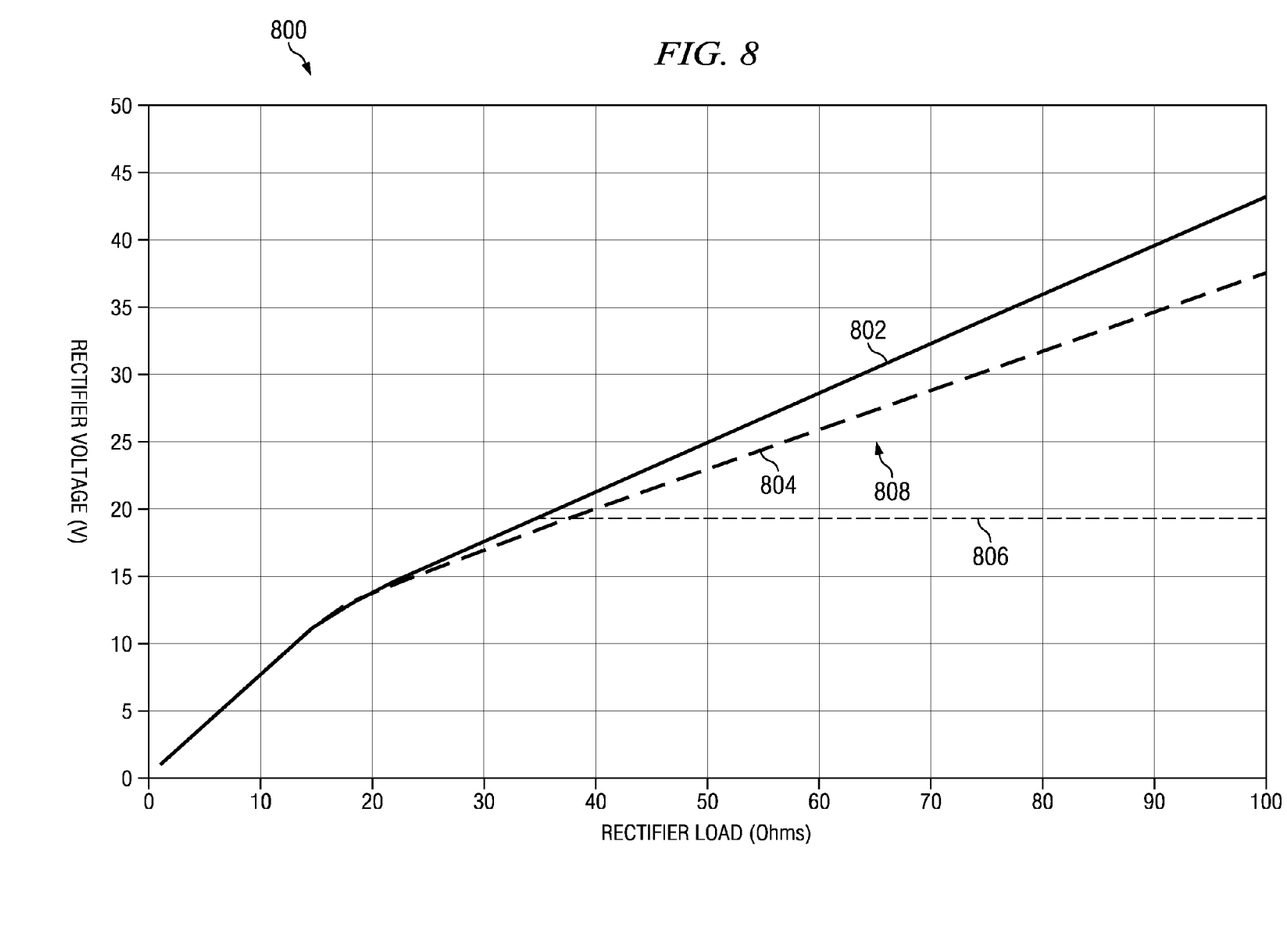
FIG. 8 is a graph depicting measured rectifier output voltages as functions of load and frequency for the inductive power transfer systems of FIGS. 1-3B.

FIG. 8 is a graph 800 depicting measured rectifier output voltages 802, 804, 806 as functions of load and frequency for the inductive power transfer systems 100, 200, 300, and 310 of FIGS. 1-3. As described above, the example receiver circuits 104 of FIGS. 1-3 have resonances frequencies of about 100 kHz. As illustrated in FIG. 8, the output voltage 125 of the synchronous rectifier 124 (e.g., the voltage at the rectifier capacitor 126) increases substantially proportionally to the load of the synchronous rectifier 124. Additionally, the rectifier voltage increases at a higher rate per unit resistance (ohm) as the operating frequency approaches the resonance frequency of the receiver circuit 104. For example, the rectifier voltage at 104 kHz 802 for a 40 ohm ($\Omega$) load is about 21.5 volts (V), while the rectifier voltage at 106 kHz 804 for a 40$\Omega$ load is about 20 V. As the rectifier voltages 802 and 804 increase to hazardous voltages 808, the synchronous rectifier 124, the rectifier capacitor 126, and/or the linear charger 128 may be damaged.

The example inductive power transfer systems 200, 300, and 310 prevent the example rectifier voltage 806 from increasing above an overvoltage threshold (e.g., 18 V). In contrast to the inductive power transfer system 100 of FIG. 1, which may be subjected to the hazardous voltages 808 that may damage the system 100, the example inductive power transfer systems 200, 300 are limited to the overvoltage threshold. As described above, when the rectifier output voltage 806 increases above a threshold voltage, the clamping circuits 202, 302, and 312 limit the rectifier output voltage 806. Thus, the example inductive power transfer systems 200, 300, and 310 described above may be implemented with less manufacturing cost than the inductive power transfer system 100 of FIG. 1 by including the clamping circuits 202, 302, and 312 to protect smaller, less expensive circuit components.

Although certain example methods and apparatus are described herein, other implementations are possible. The scope of coverage of this patent is not limited to the specific examples described herein. On the contrary, this patent covers all methods and apparatus falling within the scope of the invention.

What is claimed is:

1. An output overvoltage protection circuit, comprising:
    a first terminal configured to receive an alternating current signal through a first capacitor for conversion to a second signal;
    a second terminal to receive the second signal based on the alternating current signal;
    a second capacitor in circuit with the first terminal prior to the conversion of the alternating current signal to a direct current signal;
    a switch in circuit with the second capacitor and the first terminal configured to selectively electrically couple the second capacitor to the first terminal based on an overvoltage detection signal to reduce an overvoltage on the second signal; and
    an overvoltage detector in circuit with the second terminal and the switch and configured to determine a signal level of the second signal and, in response to determining that the signal level of the second signal is greater than a threshold, to output the overvoltage detection signal to cause the switch to electrically couple the second capacitor between the first terminal and a third terminal to reduce overvoltage at an output;
    further comprising
    a rectifier circuit in circuit with the first and second terminals, the first capacitor, and the switch and configured to generate the second signal, wherein the switch selectively couples the second capacitor between the first terminal and a reference; and
    a second switch configured to selectively couple a third capacitor between the third terminal and the reference based on the overvoltage detection signal when an electrical signal level on the third terminal is less than a second threshold.

2. An overvoltage protection circuit as defined in claim 1, wherein the overvoltage detector comprises a comparator configured to compare the second signal to the threshold and to generate the overvoltage detection signal when the second signal is greater than the threshold.

3. An overvoltage protection circuit as defined in claim 1, wherein the overvoltage detector comprises a pull down resistor and a breakdown diode that has a breakdown voltage substantially equal to the threshold, wherein the breakdown diode is configured to output the overvoltage detection signal when a voltage on the second signal exceeds the breakdown voltage.

4. An overvoltage protection circuit as defined in claim 1, further comprising a rectifier capacitor configured to smooth the rectified signal.

5. An overvoltage protection circuit, comprising:
    a first terminal configured to receive an alternating current signal through a first capacitor for conversion to a second signal;
    a second terminal to receive the second signal based on the alternating current signal;
    a second capacitor in circuit with the first terminal;
    a switch in circuit with the second capacitor and the first terminal configured to selectively electrically couple the second capacitor to the first terminal based on an overvoltage detection signal to reduce an overvoltage on the second signal; and
    an overvoltage detector in circuit with the second terminal and the switch and configured to determine a signal level of the second signal and, in response to determining that the signal level of the second signal is greater than a threshold, to output the overvoltage detection signal to cause the switch to electrically couple the capacitor between the first terminal and a reference;
    a switch driver configured to receive the overvoltage detection signal and to selectively output a clamp signal to cause the switch to electrically couple the capacitor to the first terminal, wherein the switch driver comprises a comparator configured to compare the overvoltage detection signal to the threshold and output the clamp signal based on the comparison, and a latch configured to output the clamp signal to the switch when the alternating current signal is less than a second threshold.

6. An overvoltage protection circuit as defined in claim 5, wherein the switch driver comprises a second comparator configured to compare the alternating current signal to the second threshold.

7. An overvoltage protection circuit as defined in claim 5, wherein the switch driver outputs the clamp signal when the alternating current signal is substantially at a neutral signal level.

8. A method to clamp an overvoltage, comprising:
    receiving an alternating current signal at a first power source terminal;
    rectifying the alternating current signal to generate a rectified signal;
    comparing the rectified signal to a threshold signal level; and
    coupling a capacitor to the first power source terminal when the rectified signal is greater than the threshold signal level wherein coupling a clamp capacitor to the first power source terminal comprises coupling the clamp capacitor between the first power source terminal and a second power source terminal which comprises coupling a first capacitor between the first power source terminal and a reference when the electrical power signal at the first power source terminal is substantially at a neutral signal level, and coupling a second capacitor between the second power source terminal and the reference when a second electrical power signal at the second power source terminal is substantially at the neutral signal level.

9. An inductive power transfer system having overvoltage protection, comprising:
    a receiver coil having first and second terminals and configured to generate an alternating current signal over the first and second terminals based on a voltage, a current, and a frequency of a transmitter coil;

a rectifier configured to rectify the alternating current signal and to output a rectified signal;
an overvoltage protection circuit, the overvoltage protection circuit comprising:
a first clamp capacitor and a second clamp capacitor;
a first switch configured to selectively electrically couple the first clamp capacitor between the first terminal and a reference to reduce an overvoltage of the rectified signal based on a first clamp signal;
a second switch configured to selectively electrically couple the second clamp capacitor between the second terminal and the reference to reduce the overvoltage based on a second clamp signal;
an overvoltage detector configured to determine a signal level of the rectified signal and, in response to determining that the signal level of the rectified signal is greater than a first threshold, to output the overvoltage detection signal;
a first switch driver configured to receive the overvoltage detection signal and to output the first clamp signal to cause the first switch to selectively electrically couple the first terminal to the reference when a first power signal at the first terminal is less than a second threshold; and
a second switch driver configured to receive the overvoltage detection signal and to output the second clamp signal to cause the second switch to selectively electrically couple the second terminal to the reference when a second power signal at the second terminal is less than the second threshold.

* * * * *